(12) United States Patent
DiPietro et al.

(10) Patent No.: US 9,213,648 B1
(45) Date of Patent: Dec. 15, 2015

(54) SYSTEM, APPARATUS, AND METHOD OF SECURELY ERASING CACHE

(71) Applicant: EMC Corporation, Hopkinton, MA (US)

(72) Inventors: Guido A. DiPietro, Sterling, MA (US); Michael J. Cooney, Mendon, MA (US); Gerald E. Cotter, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 166 days.

(21) Appl. No.: 14/145,266

(22) Filed: Dec. 31, 2013

(51) Int. Cl.
*G06F 12/02* (2006.01)
*G06F 12/08* (2006.01)

(52) U.S. Cl.
CPC .................. *G06F 12/0891* (2013.01)

(58) Field of Classification Search
CPC .................................. G06F 12/0891
USPC ......... 711/135, 112, 114, 144, 156, 216, 221; 365/185.33
See application file for complete search history.

(56) References Cited

U.S. PATENT DOCUMENTS

| | | | | |
|---|---|---|---|---|
| 5,375,227 A * | 12/1994 | Akatsu et al. | ................. | 714/5.11 |
| 5,949,970 A * | 9/1999 | Sipple et al. | ..................... | 714/15 |
| 6,973,541 B1 * | 12/2005 | Williams et al. | .............. | 711/135 |
| 8,352,691 B2 * | 1/2013 | Grusy et al. | ................... | 711/156 |
| 8,510,511 B2 * | 8/2013 | Woffinden | ..................... | 711/144 |
| 8,521,964 B2 * | 8/2013 | Woffinden | ..................... | 711/144 |
| 8,661,068 B1 * | 2/2014 | Seibel et al. | .................. | 707/825 |
| 8,671,253 B2 * | 3/2014 | Grusy et al. | ................... | 711/156 |
| 8,694,703 B2 * | 4/2014 | Hans et al. | ....................... | 710/65 |
| 8,918,601 B2 * | 12/2014 | Woffinden | ..................... | 711/159 |
| 8,930,635 B2 * | 1/2015 | Woffinden | ..................... | 711/141 |
| 2011/0145510 A1 * | 6/2011 | Woffinden | ..................... | 711/141 |
| 2011/0145511 A1 * | 6/2011 | Woffinden | ..................... | 711/141 |
| 2011/0145546 A1 * | 6/2011 | Woffinden | ..................... | 712/30 |
| 2011/0307447 A1 * | 12/2011 | Sabaa et al. | ................... | 707/637 |
| 2012/0203967 A1 * | 8/2012 | Woffinden | ..................... | 711/118 |
| 2012/0203984 A1 * | 8/2012 | Woffinden | ..................... | 711/154 |
| 2013/0318051 A1 * | 11/2013 | Kumar et al. | .................. | 707/692 |
| 2014/0115182 A1 * | 4/2014 | Sabaa et al. | ................... | 709/232 |

* cited by examiner

*Primary Examiner* — Stephen Elmore
(74) *Attorney, Agent, or Firm* — Krishnendu Gupta; Konrad R. Lee

(57) ABSTRACT

A computer-executable method, system, and computer program product for managing a data storage system, wherein the data storage system includes a cache and a data storage array, the computer-executable method comprising receiving a request to initialize a data storage system and initializing the data storage system by purging the cache.

15 Claims, 9 Drawing Sheets

SYSTEM, APPARATUS, AND METHOD OF SECURELY ERASING CACHE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing a data storage system, wherein the data storage system includes a cache and a data storage array, the computer-executable method comprising receiving a request to initialize a data storage system and initializing the data storage system by purging the cache.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Typically, data storage systems are relied upon to provide high performance data storage solutions. Traditionally, high performance solutions mean that a data storage system is fast, reliable, and efficient in their use of data storage resources. Generally, performance of a data storage system is affected by where, within the data storage system, data is stored. Conventionally, being able to improve the performance of data storage systems may be beneficial to the data storage industry.

Traditionally, cache within data storage system are periodically wiped to improve performance of the data storage system. Generally, erasing cache within a data storage system involves deleting the file allocation table and/or hash table that stores the location of data within a cache. Typically, data persists in cache when purged of data. Conventionally, persistent data in cache prevents an optimal environment for pre-loading cache.

In many embodiments, the current disclosure may enable optimizing efficiency of a data storage system. In various embodiments, the current disclosure may enable creation of a data management module enabled to securely erase a cache. In certain embodiments, securely erasing a cache may mean initializing the memory chips of the cache to an initial and/or virgin state. In other embodiments, an initial and/or virgin state may include a state where cache does not include any data blocks. In certain embodiments, an initial and/or virgin state may include a state where each memory cell in cache is written with a '1'. In some embodiments, an initial and/or virgin state may include a state where each memory cell in cache is written with a '0'. In many embodiments, an initial and/or virgin state may mean placing destroying all data on a cache.

In various embodiments, a data management module may be enabled to issue a purge command to a cache to place the cache in an initial state. In certain embodiments, cache may mean flash cache. In other embodiments, a purge command may invalidate cache memory the command is directed to. In some embodiments, a purge command may delete a file allocation table and/or a hash table which may be a record of data stored within cache. In many embodiments, a purge command may be enabled to destroy all data on a cache drive. In certain embodiments, a purge command may be enabled to delete a file allocation table and/or may be enabled to destroy all data on a cache drive.

Figure 1:
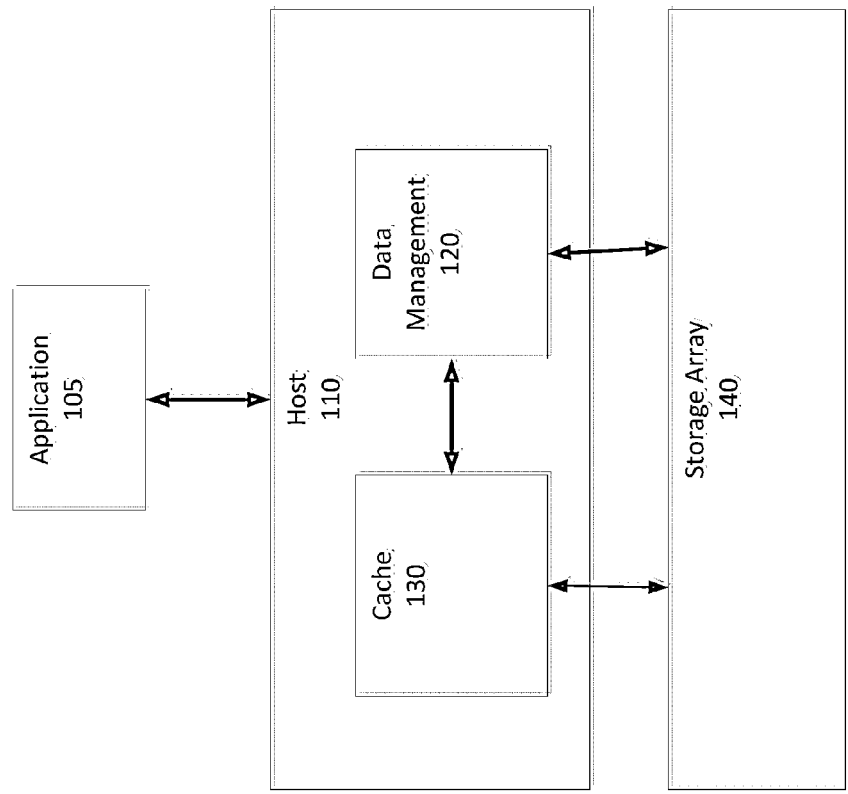
FIG. 1 is a simplified illustration of a data storage system, in accordance with the present disclosure.

Refer to the example embodiment of FIG. 1. FIG. 1 is a simplified illustration of a data storage system, in accordance with the present disclosure. Data storage system 100 includes host 110 and data storage array 140. As shown, host 110 includes data management module 120 and cache 130. In this embodiment, data management module 120 is enabled to manage data stored on data storage system 100. Application 105 is enabled to store data on data storage system 100 in data storage array 140. As shown, data management module 120 is enabled to cache data on cache 130 to enable faster access of data by application 105. In many embodiments, cache may be flash cache.

Figure 2:
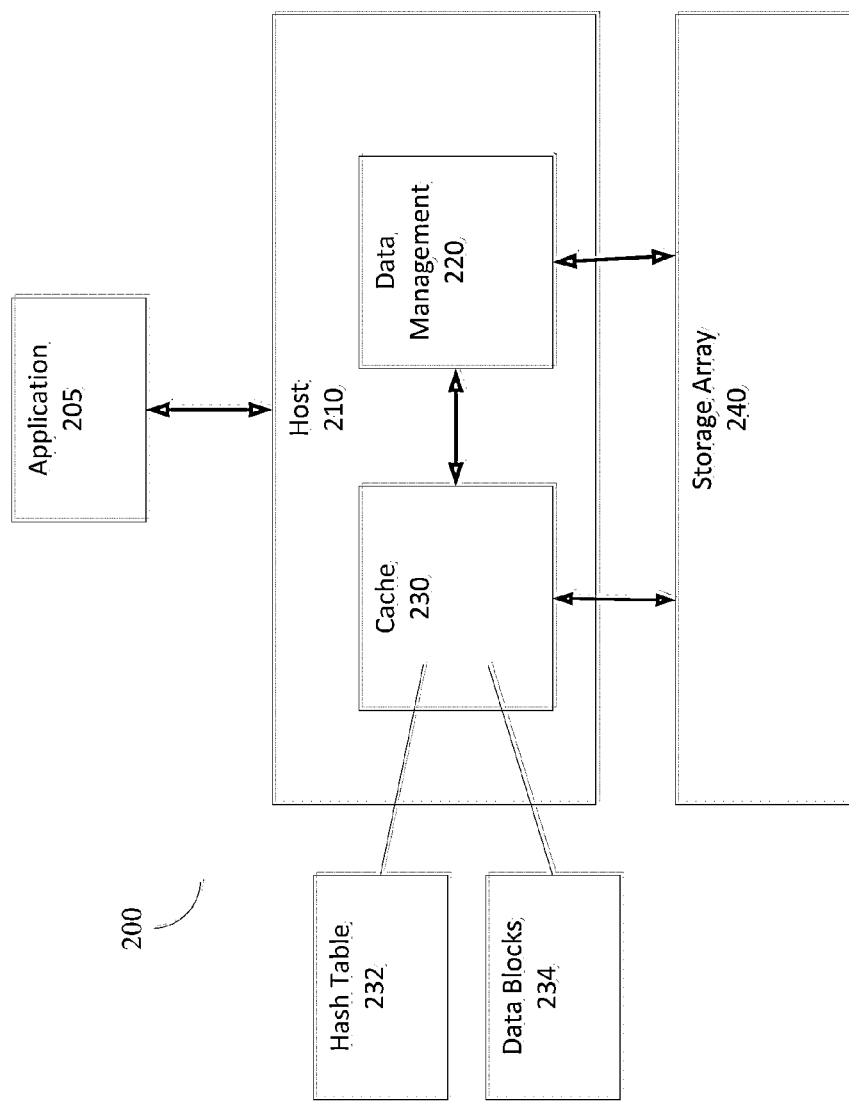
FIG. 2 is an alternative simplified illustration of a data storage system, in accordance with the present disclosure.

Refer to the example embodiment of FIG. 2. FIG. 2 is an alternative simplified illustration of a data storage system, in accordance with the present disclosure. As shown, data storage system 200 includes host 210 and data storage array 240. Host includes data management module 220 and cache 230. Cache 230 includes hash table 232 and is enabled to store data blocks 234. Cache 230 is enabled to use hash table 232 to store information about data blocks 234 stored on cache 230. In many embodiments, cache may include one or more devices that may be enabled to store one or more data blocks. In various embodiments, clearing a cache's hash table may not purge the one or more devices used by a cache to store data blocks.

Figure 3:
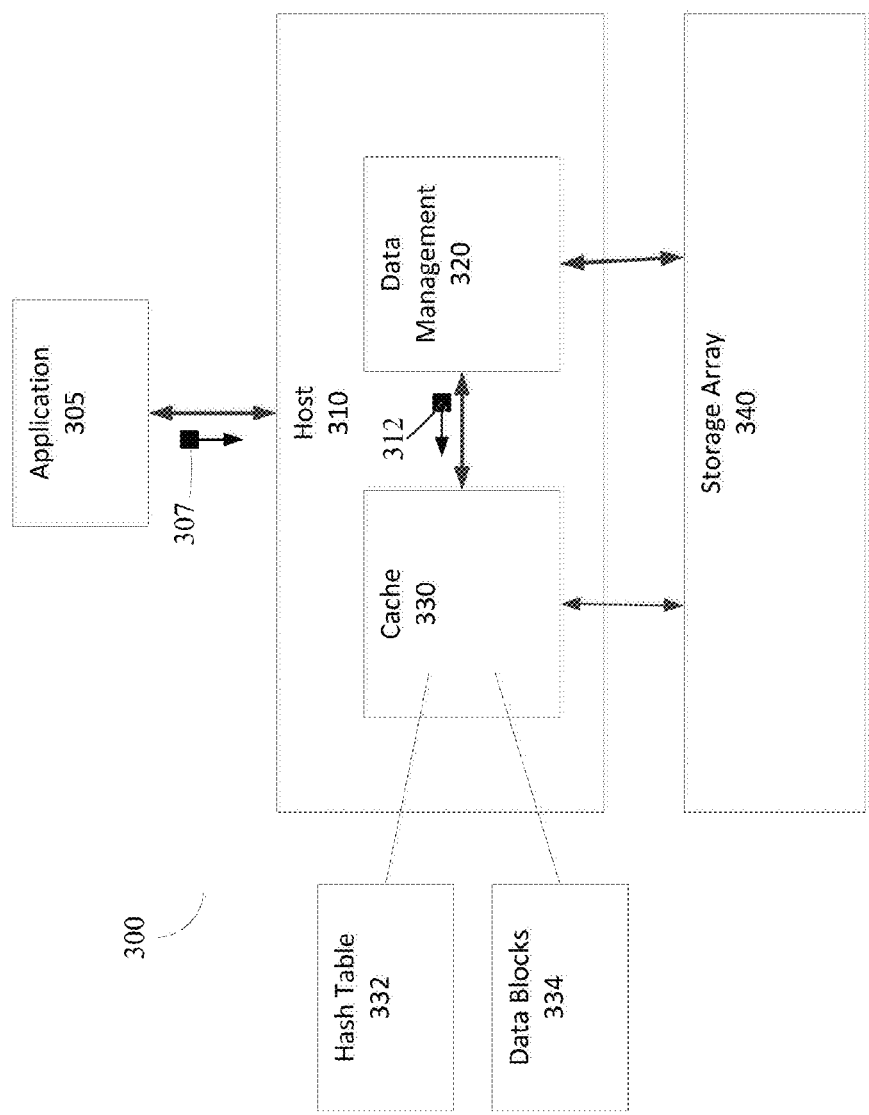
FIG. 3 is a simplified illustration of a data storage system purging cache, in accordance with an embodiment of the present disclosure.

Refer to the example embodiment of FIG. 3. FIG. 3 is a simplified illustration of a data storage system purging cache, in accordance with an embodiment of the present disclosure. As shown, data storage system 300 includes host 310 and data storage array 340. In this embodiment, application 305 is initiating execution on data storage system 300 using message 307. Data management 320 receives initialization request in message 307 and issues a purge command using message 312. Cache 330 receives the purge command and clears hash table 332 and destroys data blocks 334. In many embodiments, placing cache in an initial and/or virgin state may enable a data storage system to more quickly warm up the cache. In various embodiments, when a cache is not securely erased, data blocks remain stored on the cache's memory even when a cache's hash table has been cleared. In certain embodiments, initializing a cache's device memory may enable a quicker pre-load of data into cache.

Figure 4:
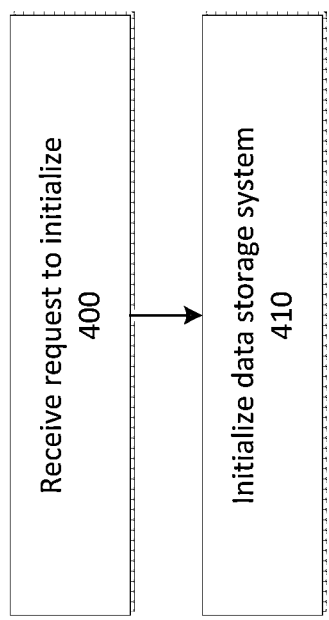
FIG. 4 is a simplified flowchart of a method of securely erasing cache in a data storage system, in accordance with an embodiment of the present disclosure.

Refer to the example embodiments of FIGS. 3 and 4. FIG. 4 is a simplified flowchart of a method of securely erasing cache in a data storage system, in accordance with an embodiment of the present disclosure. In this embodiment, data storage system 300 receives request to initialize in message 307 from application 305 (Step 400). Data storage system 300 uses data management module 320 to initialize data storage system 300 (Step 410).

Figure 5:
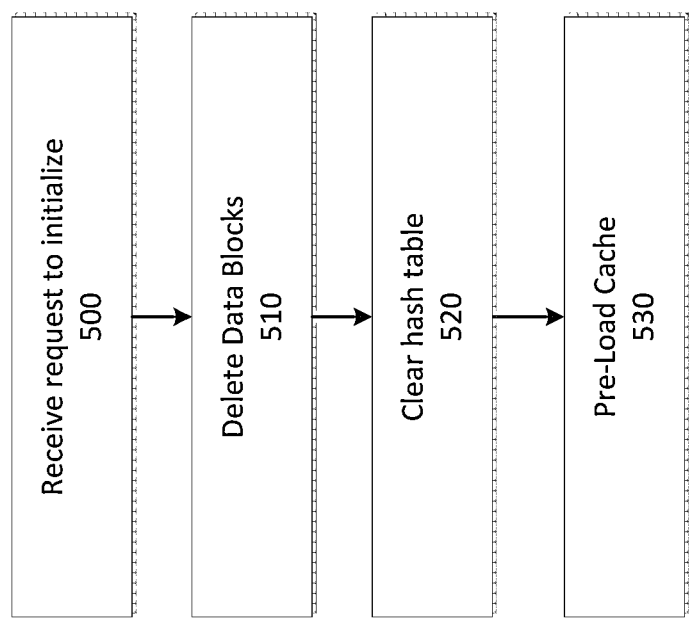
FIG. 5 is a simplified flowchart of a method securely erasing cache in a data storage system and re-initializing the cache, in accordance with an embodiment of the present disclosure.

Refer to the example embodiments of FIGS. 3 and 5. FIG. 5 is an alternative simplified flowchart of a method securely erasing cache in a data storage system, in accordance with an embodiment of the present disclosure. Data storage system 300 receives request to initialize (Step 500) from application 305. Data storage system 300 directs host 310 to initialize cache 330. Data management module 320 sends a purge command in message 312 to cache 330. Cache 330 receives purge command which directs cache 330 to delete data blocks 334 (Step 510) and clear hash table 332 (Step 520). Data management module 320 directs cache 330 to pre-load cache (Step 530) from data storage array 340. In this embodiment, the virgin state of cache 330 enables cache 330 to pre-load data faster than in a non-virgin state.

Figure 6:
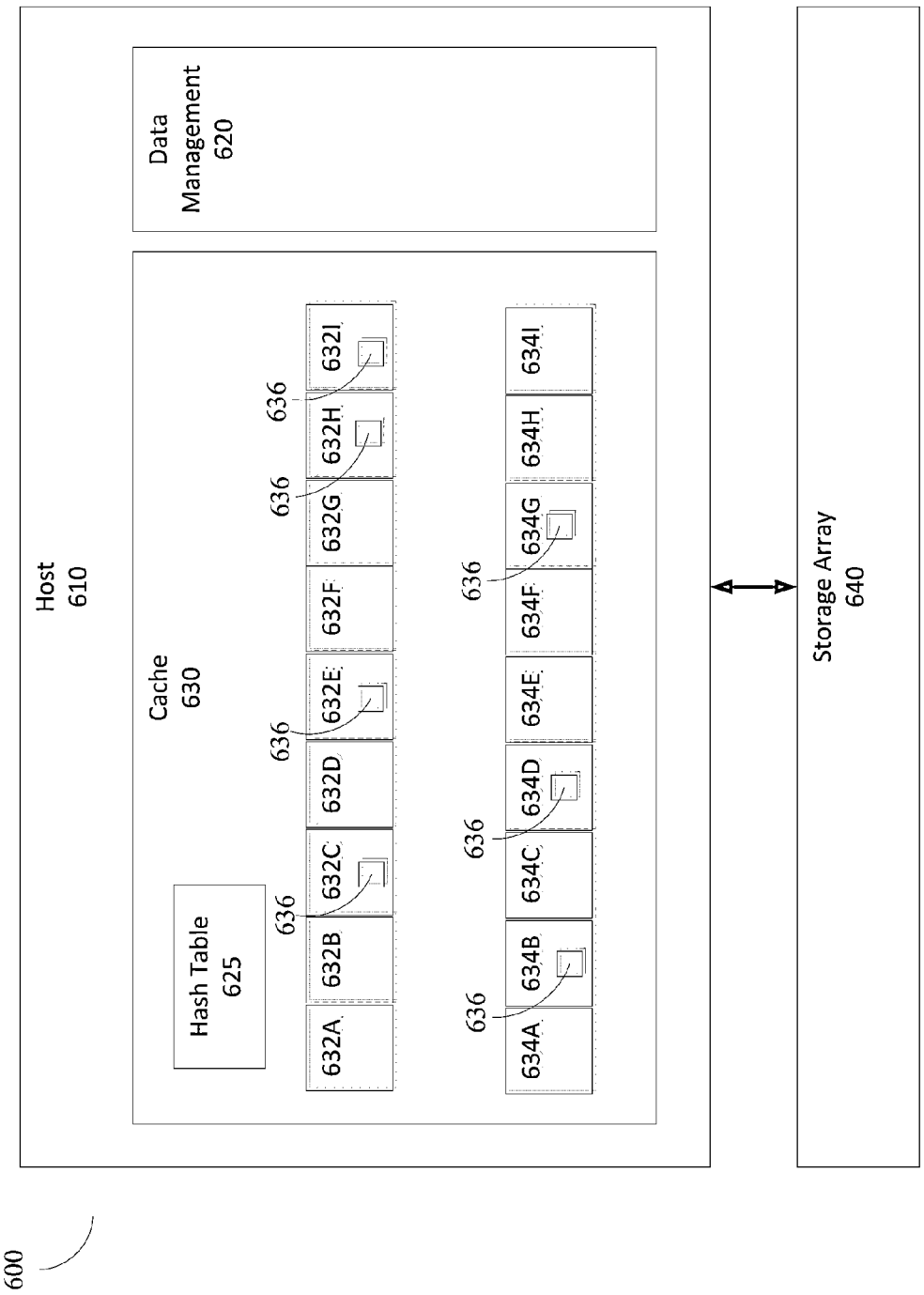
FIG. 6 is a simplified state diagram of a data storage system before a secure erase has been requested, in accordance with an embodiment of the present disclosure.

Refer to the example embodiment of FIG. 6. FIG. 6 is a simplified state diagram of a data storage system before a secure erase has been requested, in accordance with an embodiment of the present disclosure. As shown, data storage system 600 includes Host 610 and data storage array 640. Host 610 includes data management 620 and cache 630. Cache 630 includes hash table 625 and is enabled to store data within memory (632A-I, 632 generally) (634A-I, 634 generally). In this embodiment, cache 630 has not been purged. Hash table 625 contains references related to data 636 stored within cache 630. Data 636 is stored within memory 632C, 632E, 632H, 632I, 634B, 634D, 634G.

Figure 7:
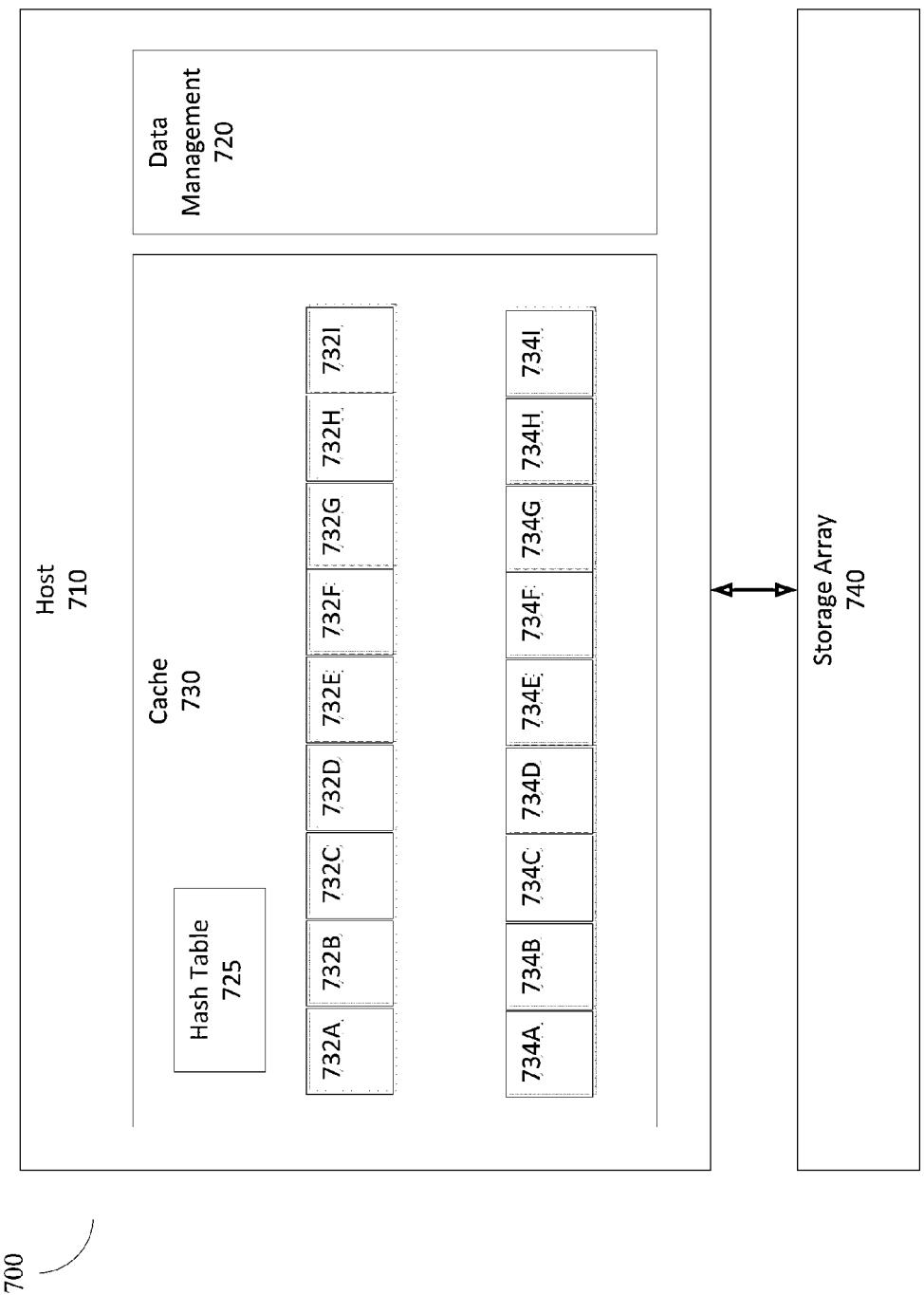
FIG. 7 is a simplified state diagram of a data storage system after a secure erase has been requested, in accordance with an embodiment of the present disclosure.

Refer to the example embodiment of FIG. 7. FIG. 7 is a simplified state diagram of a data storage system after a secure erase has been requested, in accordance with an embodiment of the present disclosure. As shown, data storage system 700 includes host 710 and data storage array 740. Data storage array 700 is shown in a state after a secure erase has been completed. Hash table 725 has been cleared. Memory (732A-I, 732 generally) (734A-I, 734 generally) has been initialized to a virgin state where all data previously stored in memory 732, 734 has been destroyed.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
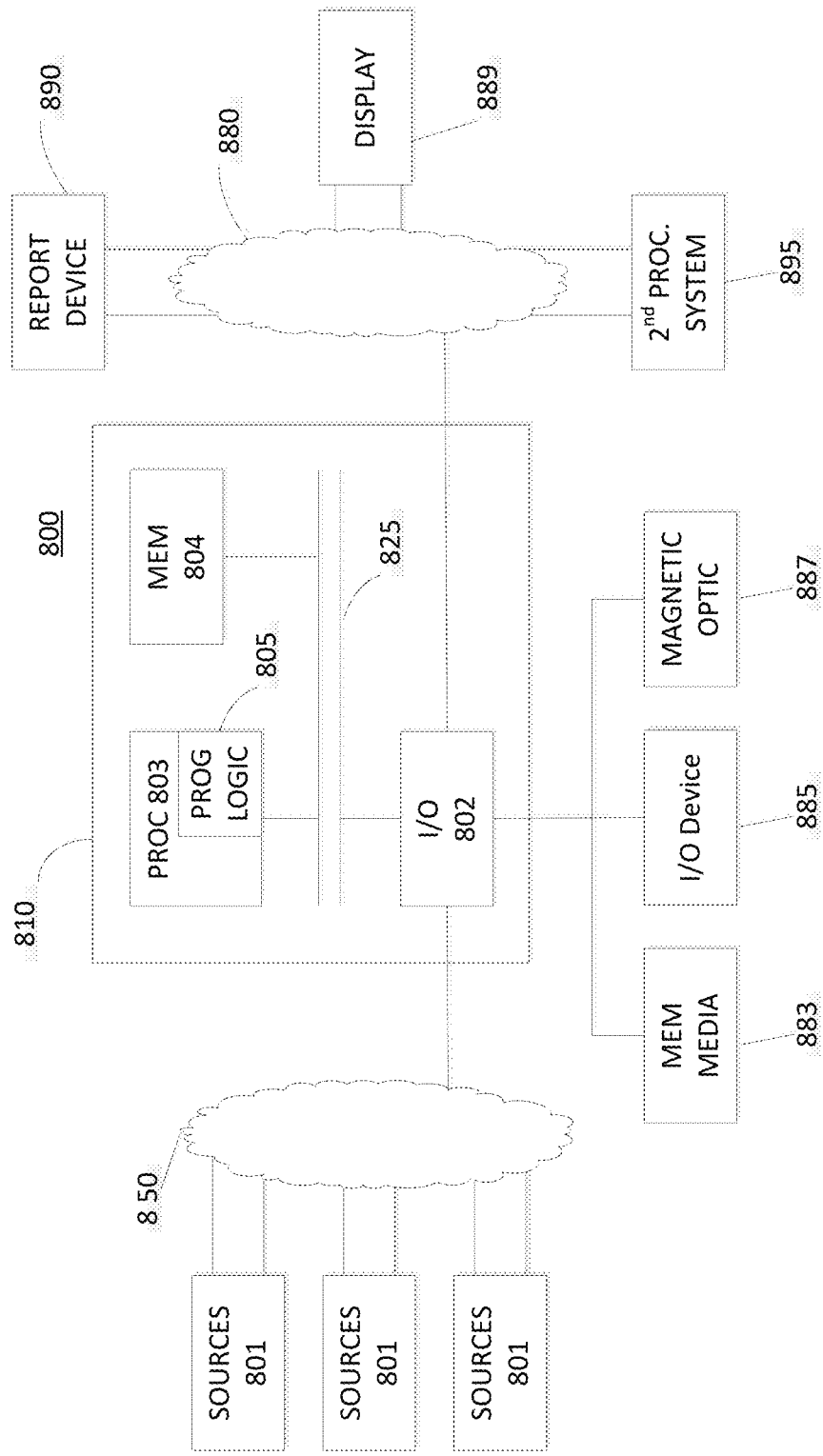
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 may include one or more I/O ports 802, a processor 803, and memory 804, all of which may be connected by an interconnect 825, such as a bus. Processor 803 may include program logic 805. The I/O port 802 may provide connectivity to memory media 883, I/O devices 885, and drives 887, such as magnetic or optical drives. When the program code is loaded into memory 704 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
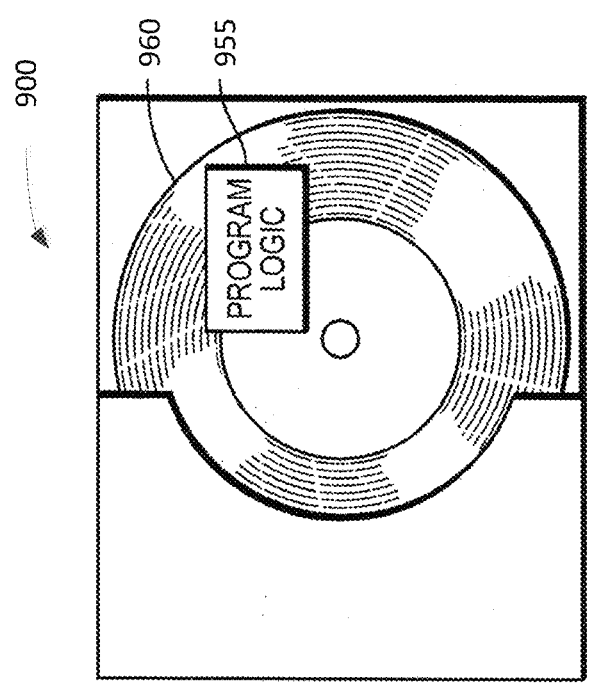
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing a data storage system, wherein the data storage system includes a cache and a data storage array, the computer-executable method comprising:
   receiving a request to initialize a data storage system; and
   initializing the data storage system by purging the cache.

2. The computer-executable method of claim 1, wherein the cache is flash cache.

3. The computer-executable method of claim 1, wherein the initializing comprises:
   clearing a hash table of the cache, wherein the hash table indicates an allocation of data blocks on the cache.

4. The computer-executable method of claim 1, wherein the initializing comprises:
   erasing the cache by removing each data block stored on the cache, thereby placing the cache in a reset state.

5. The computer-executable method of claim 1, further comprising:
   wherein the request includes information related to a future use of the data storage system; and
   managing the data storage system based on the information.

6. A system, comprising:
   a data storage system, wherein the data storage system includes a cache and a data storage array; and
   computer-executable logic encoded in memory of one or more computers in communication with the data storage system to enable the management of the cache, wherein the computer-executable program logic is configured for the execution of:
   receiving a request to initialize a data storage system; and
   initializing the data storage system by purging the cache.

7. The system of claim 6, wherein the cache is flash cache.

8. The system of claim 6, wherein the initializing comprises:
   clearing a hash table of the cache, wherein the hash table indicates an allocation of data blocks on the cache.

9. The system of claim 6, wherein the initializing comprises:
   erasing the cache by removing each data block stored on the cache, thereby placing the cache in a reset state.

10. The system of claim 6, wherein the computer-executable program logic is further configured for the execution of:
    wherein the request includes information related to a future use of the data storage system; and
    managing the data storage system based on the information.

11. A computer program product for managing a data storage system, wherein the data storage system includes a cache and a data storage array, the computer program product comprising:
    a non-transitory computer readable medium encoded with computer-executable program code for using read signatures in replication, the code configured to enable the execution of:
    receiving a request to initialize a data storage system; and
    initializing the data storage system by purging the cache.

12. The computer program product of claim 11, wherein the cache is flash cache.

13. The computer program product of claim 11, wherein the initializing comprises:
    clearing a hash table of the cache, wherein the hash table indicates an allocation of data blocks on the cache.

14. The computer program product of claim 11, wherein the initializing comprises:
    erasing the cache by removing each data block stored on the cache, thereby placing the cache in a reset state.

15. The computer program product of claim 11, wherein the code is further configured to enable the execution of:
    wherein the request includes information related to a future use of the data storage system; and
    managing the data storage system based on the information.

* * * * *